(12) United States Patent
Presz, Jr.

(10) Patent No.: US 8,534,992 B2
(45) Date of Patent: Sep. 17, 2013

(54) WIND TURBINE

(75) Inventor: Walter M. Presz, Jr., Wilbraham, MA (US)

(73) Assignee: FloDesign Wind Turbine Corp., Waltham, MA (US)

( * ) Notice: Subject to any disclaimer, the term of this patent is extended or adjusted under 35 U.S.C. 154(b) by 511 days.

(21) Appl. No.: 12/779,510

(22) Filed: May 13, 2010

(65) Prior Publication Data

US 2010/0316487 A1 Dec. 16, 2010

Related U.S. Application Data

(63) Continuation-in-part of application No. 12/054,050, filed on Mar. 24, 2008, now Pat. No. 8,021,100.

(60) Provisional application No. 60/919,588, filed on Mar. 23, 2007, provisional application No. 61/177,880, filed on May 13, 2009.

(51) Int. Cl.
*F03D 1/04* (2006.01)

(52) U.S. Cl.
USPC .................................................. 415/121.3

(58) Field of Classification Search
USPC ........................................................ 416/62, 71
See application file for complete search history.

(56) References Cited

U.S. PATENT DOCUMENTS

| | | | | |
|---|---|---|---|---|
| 4,140,433 A | * | 2/1979 | Eckel | 415/209.1 |
| 4,166,596 A | * | 9/1979 | Mouton et al. | 244/30 |
| 4,830,315 A | * | 5/1989 | Presz et al. | 244/200 |
| 2005/0249579 A1 | * | 11/2005 | Grubb | 415/4.3 |
| 2007/0267874 A1 | * | 11/2007 | Taylor et al. | 290/55 |

* cited by examiner

*Primary Examiner* — Richard Edgar
(74) *Attorney, Agent, or Firm* — McCarter & English, LLP

(57) ABSTRACT

A shrouded wind turbine includes a shroud with an exterior surface that includes a smooth outer surface. The smooth outer surface is large enough that additional devices, particularly advertising displays or solar panels, can be mounted to the shroud to more efficiently use available surface area, both on the wind turbine itself and on the footprint of the wind turbine.

18 Claims, 12 Drawing Sheets

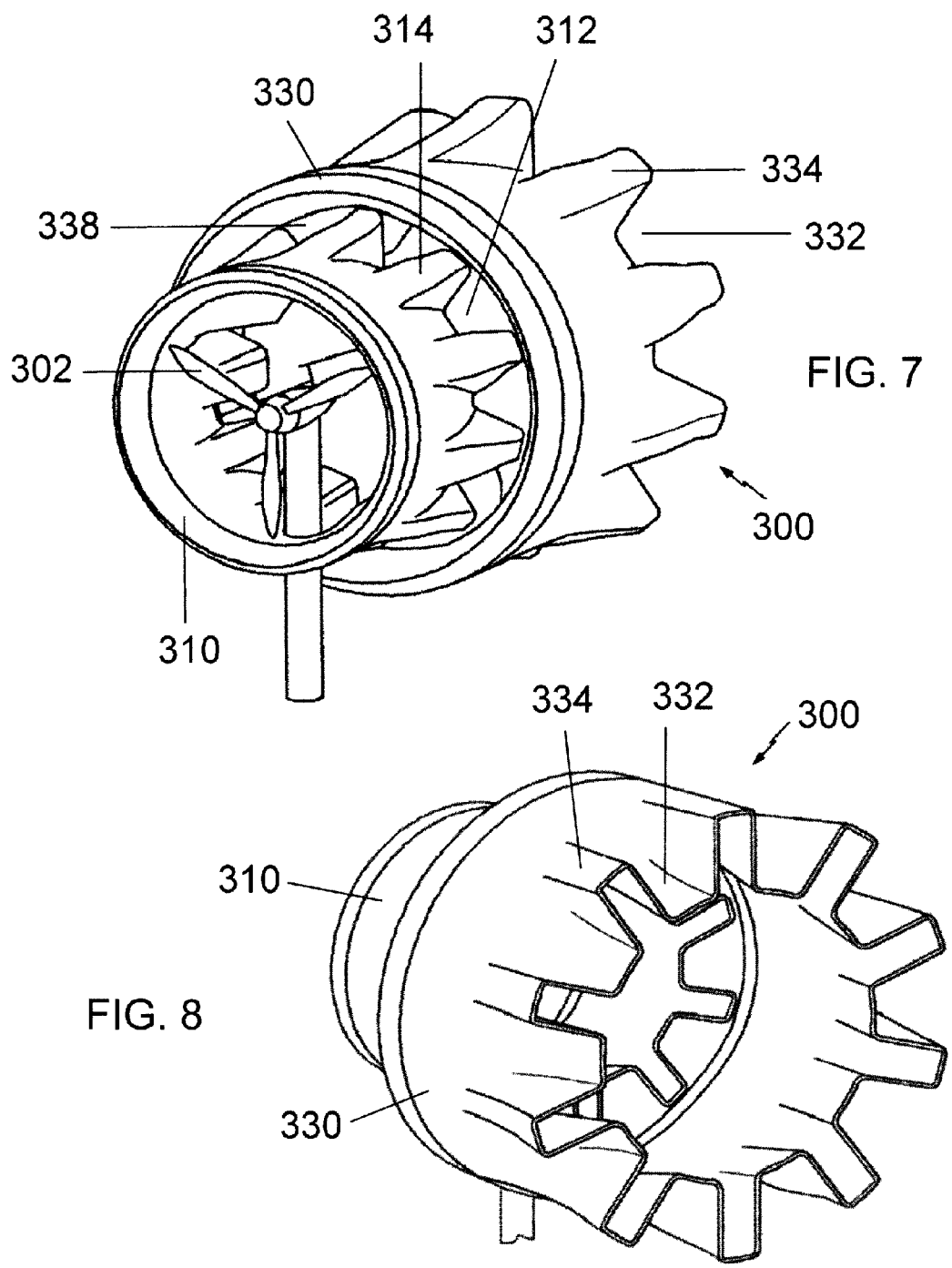

WIND TURBINE

This application is a continuation-in-part from U.S. patent application Ser. No. 12/054,050, filed Mar. 24, 2008, which claimed priority from U.S. Provisional Patent Application Ser. No. 60/919,588, filed Mar. 23, 2007. This application also claims priority to U.S. Provisional Patent Application Ser. No. 61/177,880, filed May 13, 2009. Applicants hereby fully incorporate the disclosure of these applications by reference in their entirety.

BACKGROUND

The present disclosure relates to wind turbines, particularly shrouded wind turbines that can be used for mounting additional devices upon the shroud. In particular, advertising displays or surfaces and solar panels are contemplated to be mounted.

Conventional horizontal axis wind turbines (HAWTs) wind turbines have three blades and are oriented or pointed into the wind by computer controlled motors. These turbines typically require a supporting tower ranging from 60 to 90 meters (200-300 feet) in height. The blades generally rotate at a rotational speed of about 10 to 22 rpm, with tip speeds reaching over 200 mph. A gear box is commonly used to step up the speed to drive the generator, although some designs may directly drive an annular electric generator. Some turbines operate at a constant speed. However, more energy can be collected by using a variable speed turbine and a solid state power converter to interface the turbine with the generator. Although HAWTs have achieved widespread usage, their efficiency is not optimized. In particular, they will not exceed 59.3% efficiency, i.e., the Betz limit, in capturing the potential energy of the wind passing through it.

Several problems are associated with HAWTs in both construction and operation. The tall towers and long blades are difficult to transport. Massive tower construction is required to support the heavy blades, gearbox, and generator. Very tall and expensive cranes and skilled operators are needed for installation. In operation, HAWTs require an additional yaw control mechanism to turn the blades toward the wind. HAWTs typically have a high angle of attack on their airfoils that do not lend themselves to variable changes in wind flow. HAWTs are difficult to operate in near ground, turbulent winds. Furthermore, ice build-up on the nacelle and the blades can cause power reduction and safety issues. Tall HAWTs may affect airport radar. Their height also makes them obtrusively visible across large areas, disrupting the appearance of the landscape, which may be objectionable. Finally, downwind variants suffer from fatigue and structural failure caused by turbulence.

The blade of a HAWT typically has an airfoil shape that creates a lower pressure behind the blade as the blade passes through the air. This lower pressure creates a suction effect that follows the blade and creates a large wake to form behind the HAWT. This wake can reduce the amount of power captured by wind turbines downstream of the wind turbine creating the wake by up to 30%. To reduce the amount of power depletion, downstream turbines are often offset laterally from the upstream turbine, and are placed about 10 rotor diameters downstream of the upstream turbine as well. This displacement requires a large amount of land for a wind farm, where several wind turbines are placed in a single location.

The various components of the HAWT, such as the gearbox, the rotor shaft, generator, pitch and yaw controls, and brakes, are generally located within the nacelle of the HAWT. The nacelle may have dimensions such as 24 meters in length by 6 meters in height by 6 meters in width (~79 ft long×20 ft high×20 ft wide). The nacelle usually weighs at least 10 tons, and can weigh as much as 60 tons. The nacelle itself is usually made from two pieces, a bottom and a top. The bottom piece of the nacelle is anchored to the tower, the various components are placed inside the bottom piece, and the nacelle is completed by placing the top piece to cover all of the various components. The resulting outer surface of the nacelle is generally not smooth, flat, or even. In addition, the outer surface can be difficult to see or look at due to the movement of the conspicuously visible HAWT blades.

Modern HAWTs, while having a large area swept by their blades, typically have a low solidity (blade surface area divided by total swept area) of about 7%. In many cases, large HAWT wind farms are also located in very sunny areas that could be used to capture solar energy. However, the low surface area of a HAWT does not allow for efficient capture of solar energy. In addition, the footprint of an individual HAWT on the land can be rather large, and may preclude other uses of the land, for example due to safety issues from flying ice or blades breaking.

BRIEF DESCRIPTION

Disclosed herein are shrouded wind turbines upon which are mounted additional devices such as advertising displays or solar panels.

A mixer/ejector wind turbine system (referenced herein as a "MEWT") for generating power is disclosed that combines fluid dynamic ejector concepts, advanced flow mixing and control devices, and an adjustable power turbine. In some embodiments or versions, the MEWT is an axial flow turbine comprising, in order going downstream: an aerodynamically contoured turbine shroud having an inlet; a ring of stators within the shroud; an impeller having a ring of impeller blades "in line" with the stators; a mixer, associated with the turbine shroud, having a ring of mixing lobes extending downstream beyond the impeller blades; and an ejector comprising the ring of mixing lobes and a mixing shroud extending downstream beyond the mixing lobes. The turbine shroud, mixer and ejector are designed and arranged to draw the maximum amount of wind through the turbine and to minimize impact upon the environment (e.g., noise) and upon other power turbines in its wake (e.g., structural or productivity losses). Unlike existing wind turbines, the preferred MEWT contains a shroud with advanced flow mixing and control devices such as lobed or slotted mixers and/or one or more ejector pumps. The mixer/ejector pump presented is much different than used heretofore since in the disclosed wind turbine, the high energy air flows into the ejector inlets, and outwardly surrounds, pumps and mixes with the low energy air exiting the turbine shroud.

Also disclosed in other embodiments is a turbine comprising: a mixer shroud having an outlet and an inlet for receiving a primary fluid stream; and means for extracting energy from the primary fluid stream, the means for extracting energy being located within the turbine shroud; wherein the mixer shroud includes a set of high energy mixing lobes and a set of low energy mixing lobes; wherein each high energy mixing lobe forms an angle in the range of about of 5 to 65 degrees relative to the mixer shroud; and wherein each low energy mixing lobe forms an angle in the range of about 5 to 65 degrees relative to the mixer shroud or the turbine axis.

The high energy mixing lobe angle may be different from, greater than, less than, or equal to the low energy mixing lobe angle.

The turbine may further comprise an ejector shroud downstream from and coaxial with the mixer shroud, wherein a mixer shroud outlet extends into an ejector shroud inlet. The ejector shroud may itself have a ring of mixer lobes around its outlet.

The means for extracting energy may be an impeller or a rotor/stator assembly.

Disclosed in embodiments is a shrouded horizontal axis wind turbine, which comprises an impeller; and a turbine shroud surrounding the impeller. The turbine shroud has an exterior surface and comprises a plurality of mixing lobes located along a trailing edge. The exterior surface of the turbine shroud has a smooth outer surface suitable for mounting a panel.

The panel can be an advertising display, such as a digital billboard, or the panel can be a solar panel. The smooth outer surface can be located on a side of the turbine shroud, or on a top of the turbine shroud. The ratio of a height of the outer surface to a length of the outer surface is from about 2 to about 5.

In embodiments, the exterior surface also has a non-smooth surface. In other embodiments, the wind turbine further comprises an ejector shroud having an inlet and an exit, the trailing edge of the turbine shroud extending into the ejector shroud inlet. The ejector shroud may also have an exterior surface with a smooth outer surface suitable for mounting a second panel thereon.

Also disclosed in other embodiments is a shrouded horizontal axis wind turbine, comprising: an impeller, a turbine shroud, and an ejector shroud. The turbine shroud surrounds the impeller, and comprises a plurality of mixing lobes located along a trailing edge. The ejector shroud has an inlet and an exit, the trailing edge of the turbine shroud extending into the ejector shroud inlet. The ejector shroud has an exterior surface with a smooth outer surface suitable for mounting a panel thereon.

Also disclosed is a shrouded horizontal axis wind turbine, comprising: an impeller; a shroud, and a panel. The shroud surrounds the impeller, and has an exterior surface and a recess in the exterior surface. The panel can be located in the recess, and is shaped to cooperate with the shroud to form a smooth outer surface on the exterior surface.

The panel can be an advertising display, such as a digital billboard, or the panel can be a solar panel. The smooth outer surface can be located on a side of the shroud, or on a top of the shroud. The ratio of a height of the recess to a length of the recess is from about 2 to about 5. The exterior surface of the shroud may also have a non-smooth surface.

These and other non-limiting features or characteristics of the present disclosure will be further described below.

BRIEF DESCRIPTION OF THE DRAWINGS

The following is a brief description of the drawings, which are presented for the purposes of illustrating the disclosure set forth herein and not for the purposes of limiting the same.

FIG. 7 is a front perspective view of another exemplary embodiment of a MEWT of the present disclosure. Here, both the turbine shroud and the ejector shroud have mixing lobes on their trailing edges.

FIG. 8 is a rear perspective view of the MEWT of FIG. 7.

FIG. 11A and FIG. 11B are magnified views of the mixing lobes of the MEWT of FIG. 9.

DETAILED DESCRIPTION

Figure 1:
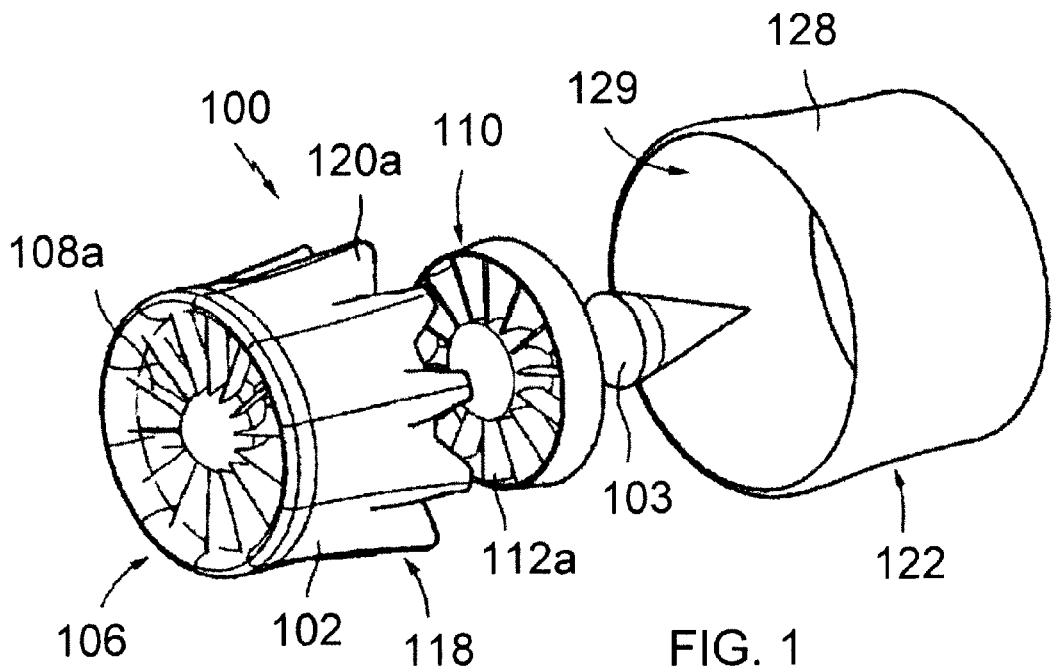
FIG. 1 is an exploded view of a first exemplary embodiment or version of a MEWT of the present disclosure.

A more complete understanding of the components, processes, and apparatuses disclosed herein can be obtained by reference to the accompanying figures. These figures are merely schematic representations based on convenience and the ease of demonstrating the present development and are, therefore, not intended to indicate the relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings and are not intended to define or limit the scope of the disclosure. In the drawings and the following description below, it is to be understood that like numeric designations refer to components of like function.

The modifier "about" used in connection with a quantity is inclusive of the stated value and has the meaning dictated by the context (for example, it includes at least the degree of error associated with the measurement of the particular quantity). When used in the context of a range, the modifier "about" should also be considered as disclosing the range defined by the absolute values of the two endpoints. For example, the range "from about 2 to about 4" also discloses the range "from 2 to 4."

A Mixer-Ejector Power System (MEPS) provides a unique and improved means of generating power from wind currents. A MEPS includes:

a primary shroud containing a turbine or bladed impeller, similar to a propeller, which extracts power from the primary stream; and a single or multiple-stage mixer-ejector to ingest flow with each such mixer/ejector stage including a mixing duct for both bringing in secondary flow and providing flow mixing-length for the ejector stage. The inlet contours of the mixing duct or shroud are designed to minimize flow losses while providing the pressure forces necessary for good ejector performance.

The resulting mixer/ejectors enhance the operational characteristics of the power system by: (a) increasing the amount of flow through the system, (b) reducing the exit or back pressure on the turbine blades, and (c) reducing the noise propagating from the system.

The MEPS may include:

camber to the duct profiles to enhance the amount of flow into and through the system;

acoustical treatment in the primary and mixing ducts for noise abatement flow guide vanes in the primary duct for control of flow swirl and/or mixer-lobes tailored to diminish flow swirl effects;

turbine-like blade aerodynamics designs based on the new theoretical power limits to develop families of short, structurally robust configurations which may have multiple and/or counter-rotating rows of blades;

exit diffusers or nozzles on the mixing duct to further improve performance of the overall system;

inlet and outlet areas that are non-circular in cross section to accommodate installation limitations;

a swivel joint on its lower outer surface for mounting on a vertical stand/pylon allowing for turning the system into the wind;

vertical aerodynamic stabilizer vanes mounted on the exterior of the ducts with tabs or vanes to keep the system pointed into the wind; or mixer lobes on a single stage of a multi-stage ejector system.

Referring to the drawings in detail, the figures illustrate alternate embodiments of Applicants' axial flow Wind Turbine with Mixers and Ejectors ("MEWT").

Figure 2:
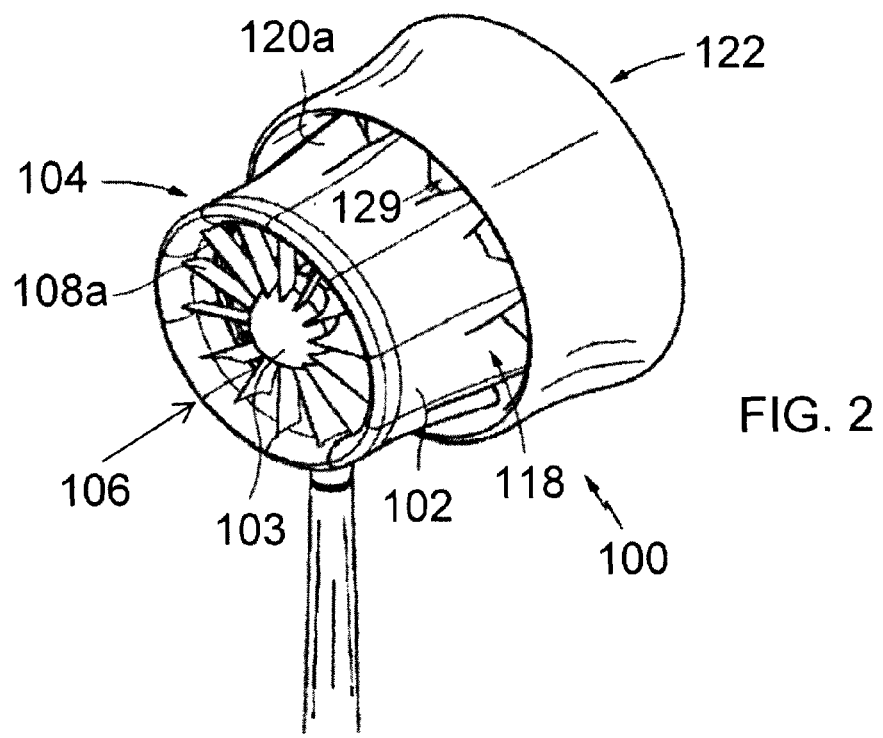
FIG. 2 is a front perspective view of FIG. 1 attached to a support tower.

Referring to FIG. 1 and FIG. 2, the MEWT 100 is an axial flow turbine with:

a) an aerodynamically contoured turbine shroud 102;

b) an aerodynamically contoured center body 103 within and attached to the turbine shroud 102;

c) a turbine stage 104, surrounding the center body 103, comprising a stator ring 106 having stator vanes 108a and a rotor 110 having rotor blades 112a. Rotor 110 is downstream and "in-line" with the stator vanes, i.e., the leading edges of the impeller blades are substantially aligned with trailing edges of the stator vanes, in which:

i) the stator vanes 108a are mounted on the center body 103;

ii) the rotor blades 112a are attached and held together by inner and outer rings or hoops mounted on the center body 103;

d) a mixer indicated generally at 118 having a ring of mixer lobes 120a on a terminus region (i.e., end portion) of the turbine shroud 102, wherein the mixer lobes 120a extend downstream beyond the rotor blades 112a; and, e) an ejector indicated generally at 122 comprising an ejector shroud 128, surrounding the ring of mixer lobes 120a on the turbine shroud, wherein the mixer lobes (e.g., 120a) extend downstream and into an inlet 129 of the ejector shroud 128.

The center body 103 of MEWT 100, as shown in FIG. 2, is desirably connected to the turbine shroud 102 through the stator ring 106, or other means. This construction serves to eliminate the damaging, annoying and long distance propagating low-frequency sound produced by traditional wind turbines as the wake from the turbine blades strike the support tower. The aerodynamic profiles of the turbine shroud 102 and ejector shroud 128 are aerodynamically cambered to increase flow through the turbine rotor.

Applicants have calculated, for optimum efficiency, the area ratio of the ejector pump 122, as defined by the ejector shroud 128 exit area over the turbine shroud 102 exit area, will be in the range of 1.5-3.0. The number of mixer lobes 120a would be between 6 and 14. Each lobe will have inner and outer trailing edge angles between 5 and 65 degrees. These angles are measured from a tangent line that is drawn at the exit of the mixing lobe down to a line that is parallel to the center axis of the turbine, as will be explained further herein. The primary lobe exit location will be at, or near, the entrance location or inlet 129 of the ejector shroud 128. The height-to-width ratio of the lobe channels will be between 0.5 and 4.5. The mixer penetration will be between 50% and 80%. The center body 103 plug trailing edge angles will be thirty degrees or less. The length to diameter (L/D) of the overall MEWT 100 will be between 0.5 and 1.25.

First-principles-based theoretical analysis of the preferred MEWT 100, performed by Applicants, indicate the MEWT can produce three or more times the power of its un-shrouded counterparts for the same frontal area; and, the MEWT 100 can increase the productivity of wind farms by a factor of two or more. Based on this theoretical analysis, it is believed the MEWT embodiment 100 will generate three times the existing power of the same size conventional open blade wind turbine.

A satisfactory embodiment 100 of the MEWT comprises: an axial flow turbine (e.g., stator vanes and impeller blades) surrounded by an aerodynamically contoured turbine shroud 102 incorporating mixing devices in its terminus region (i.e., end portion); and a separate ejector shroud 128 overlapping, but aft, of turbine shroud 102, which itself may incorporate mixer lobes in its terminus region. The ring 118 of mixer lobes 120a combined with the ejector shroud 128 can be thought of as a mixer/ejector pump. This mixer/ejector pump provides the means for consistently exceeding the Betz limit for operational efficiency of the wind turbine. The stator vanes' exit-angle incidence may be mechanically varied in situ (i.e., the vanes are pivoted) to accommodate variations in the fluid stream velocity so as to assure minimum residual swirl in the flow exiting the rotor.

Described differently, the MEWT 100 comprises a turbine stage 104 with a stator ring 106 and a rotor 110 mounted on center body 103, surrounded by turbine shroud 102 with embedded mixer lobes 120a having trailing edges inserted slightly in the entrance plane of ejector shroud 128. The turbine stage 104 and ejector shroud 128 are structurally connected to the turbine shroud 102, which is the principal load carrying member.

These figures depict a rotor/stator assembly for generating power. The term "impeller" is used herein to refer generally to any assembly in which blades are attached to a shaft and able to rotate, allowing for the generation of power or energy from wind rotating the blades. Exemplary impellers include a propeller or a rotor/stator assembly. Any type of impeller may be enclosed within the turbine shroud 102 in the wind turbine of the present disclosure.

In some embodiments, the length of the turbine shroud 102 is equal or less than the turbine shroud's outer maximum diameter. Also, the length of the ejector shroud 128 is equal or less than the ejector shroud's outer maximum diameter. The exterior surface of the center body 103 is aerodynamically contoured to minimize the effects of flow separation downstream of the MEWT 100. It may be configured to be longer or shorter than the turbine shroud 102 or the ejector shroud 128, or their combined lengths.

The turbine shroud's entrance area and exit area will be equal to or greater than that of the annulus occupied by the turbine stage 104, but need not be circular in shape so as to allow better control of the flow source and impact of its wake. The internal flow path cross-sectional area formed by the annulus between the center body 103 and the interior surface of the turbine shroud 102 is aerodynamically shaped to have a minimum area at the plane of the turbine and to otherwise vary smoothly from their respective entrance planes to their exit planes. The turbine and ejector shrouds' external surfaces are aerodynamically shaped to assist guiding the flow into the turbine shroud inlet, eliminating flow separation from their surfaces, and delivering smooth flow into the ejector entrance 129. The ejector 128 entrance area, which may alternatively be noncircular in shape, is greater than the mixer 118 exit plane area; and the ejector's exit area may also be noncircular in shape if desired.

Optional features of the preferred embodiment 100 can include: a power take-off, in the form of a wheel-like structure, which is mechanically linked at an outer rim of the impeller to a power generator; a vertical support shaft with a rotatable coupling for rotatably supporting the MEWT, the shaft being located forward of the center-of-pressure location on the MEWT for self-aligning the MEWT; and a self-moving vertical stabilizer fin or "wing-tab" affixed to upper and lower surfaces of the ejector shroud to stabilize alignment directions with different wind streams.

The MEWT 100, when used near residences can have sound absorbing material affixed to the inner surface of its shrouds 102, 128 to absorb and thus eliminate the relatively high frequency sound waves produced by the interaction of the stator 106 wakes with the rotor 110. The MEWT 100 can also contain blade containment structures for added safety. The MEWT should be considered to be a horizontal axis wind turbine as well.

Figure 3:
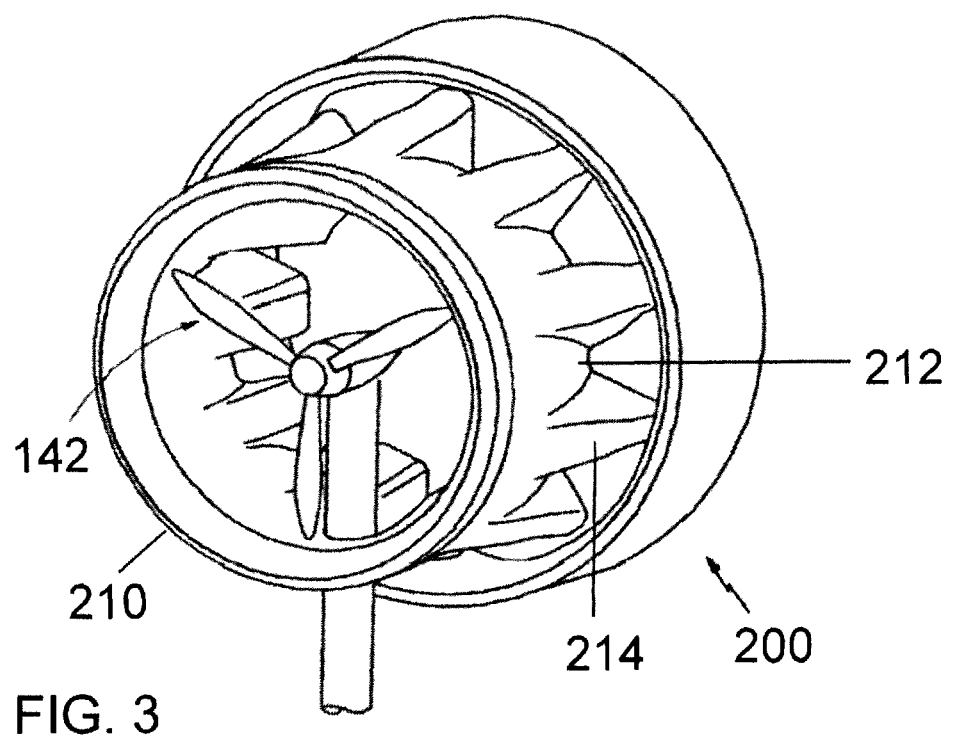
FIG. 3 is a front perspective view of a second exemplary embodiment of a MEWT, shown with a shrouded three bladed impeller.
Figure 4:
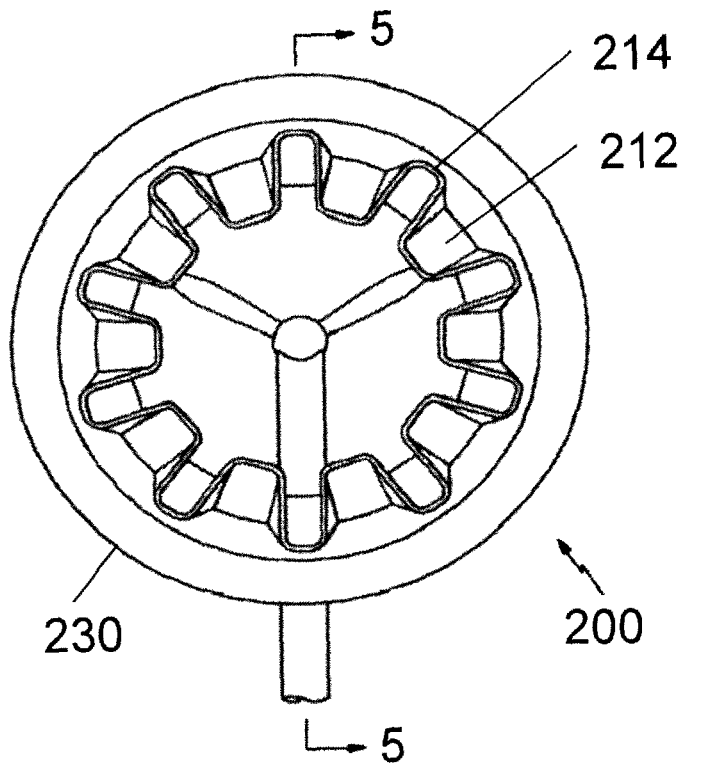
FIG. 4 is a rear view of the MEWT of FIG. 3.
Figure 5:
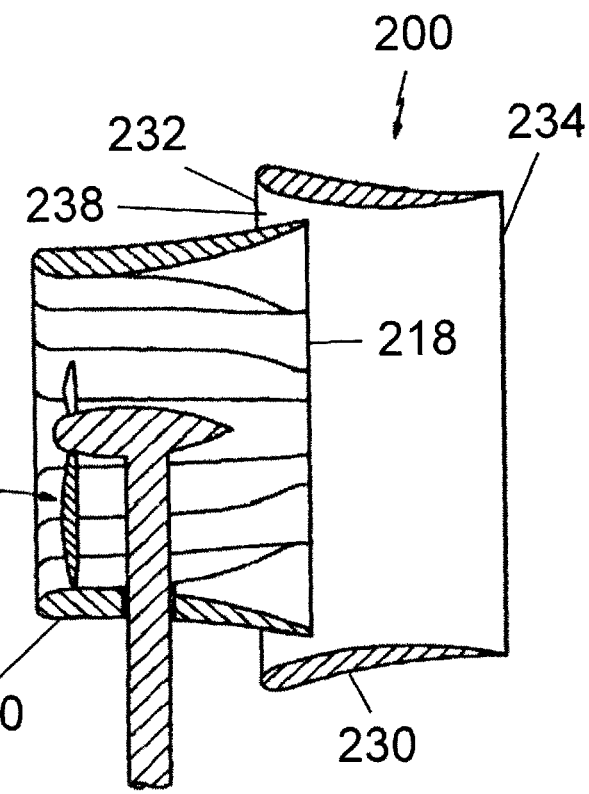
FIG. 5 is a cross-sectional view taken along line 5-5 of FIG. 4.

FIGS. 3-5 show a second exemplary embodiment of a shrouded wind turbine 200. The turbine 200 uses a propeller-type impeller 142 instead of the rotor/stator assembly as in FIG. 1 and FIG. 2. In addition, the mixing lobes can be more clearly seen in this embodiment. The turbine shroud 210 has two different sets of mixing lobes. Referring to FIG. 3 and FIG. 4, the turbine shroud 210 has a set of high energy mixing lobes 212 that extend inwards toward the central axis of the turbine. In this embodiment, the turbine shroud is shown as having 10 high energy mixing lobes. The turbine shroud also has a set of low energy mixing lobes 214 that extend outwards away from the central axis. Again, the turbine shroud 210 is shown with 10 low energy mixing lobes. The high energy mixing lobes alternate with the low energy mixing lobes around the trailing edge of the turbine shroud 210. From the rear, as seen in FIG. 4, the trailing edge of the turbine shroud may be considered as having a circular crenellated shape. The term "crenellated" or "castellated" refers to this general up-and-down or in-and-out shape of the trailing edge.

As seen in FIG. 5, the entrance area 232 of the ejector shroud 230 is larger than the exit area 234 of the ejector shroud. It will be understood that the entrance area refers to the entire mouth of the ejector shroud and not the annular area of the ejector shroud between the ejector shroud 230 and the turbine shroud 210. However, as seen further herein, the entrance area of the ejector shroud may also be smaller than the exit area 234 of the ejector shroud. As expected, the entrance area 232 of the ejector shroud 230 is larger than the exit area 218 of the turbine shroud 210, in order to accommodate the mixing lobes and to create an annular area 238 between the turbine shroud and the ejector shroud through which high energy air can enter the ejector.

The mixer-ejector design concepts described herein can significantly enhance fluid dynamic performance. These mixer-ejector systems provide numerous advantages over conventional systems, such as: shorter ejector lengths; increased mass flow into and through the system; lower sensitivity to inlet flow blockage and/or misalignment with the principal flow direction; reduced aerodynamic noise; added thrust; and increased suction pressure at the primary exit.

Figure 6:
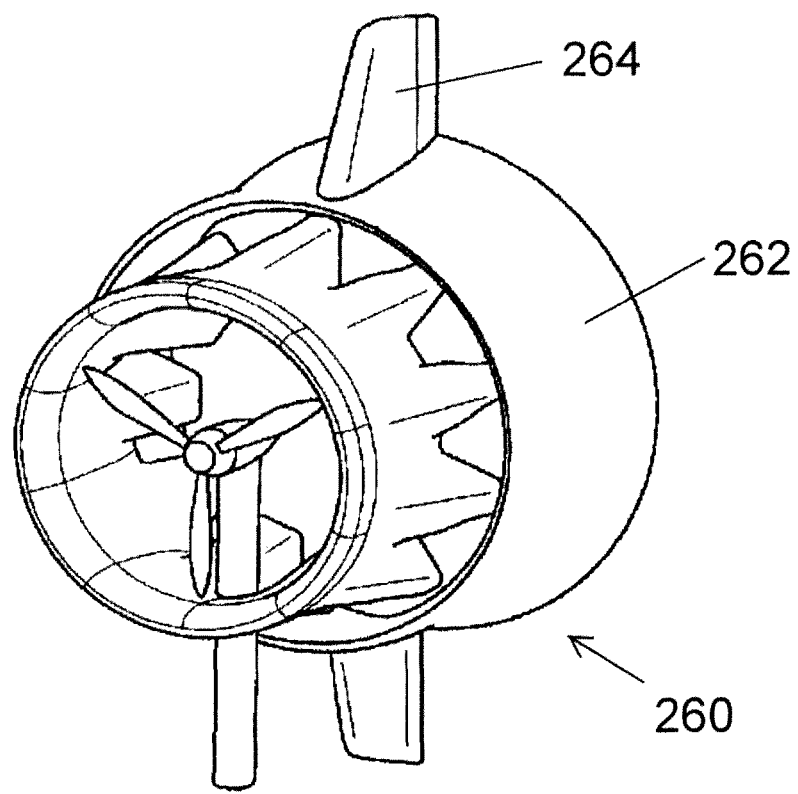
FIG. 6 is a perspective view of another exemplary embodiment of a wind turbine of the present disclosure having a pair of wing-tabs for wind alignment.

As shown in FIG. 6, another exemplary embodiment of a wind turbine 260 may have an ejector shroud 262 that has internal ribs shaped to provide wing-tabs or fins 264. The wing-tabs or fins 264 are oriented to facilitate alignment of the wind turbine 260 with the incoming wind flow to improve energy or power production.

FIG. 7 and FIG. 8 illustrate another exemplary embodiment of a MEWT. The turbine 400 again uses a propeller-type impeller 302. The turbine shroud 310 has two different sets of mixing lobes. A set of high energy mixing lobes 312 extend inwards toward the central axis of the turbine. A set of low energy mixing lobes 314 extend outwards away from the central axis. In addition, the ejector shroud 330 is provided with mixing lobes on a trailing edge thereof. Again, two different sets of mixing lobes are present. A set of high energy mixing lobes 332 extend inwards toward the central axis of the turbine. A set of low energy mixing lobes 334 extend outwards away from the central axis. As seen in FIG. 8, the ejector shroud is shown here with 10 high energy mixing lobes and 10 low energy mixing lobes. The high energy mixing lobes alternate with the low energy mixing lobes around the trailing edge of the turbine shroud 330. Again, the trailing edge of the ejector shroud may be considered as having a circular crenellated shape.

FIGS. 9-12 illustrate another exemplary embodiment of a MEWT. The MEWT 400 in FIG. 9 has a stator 408a and rotor 410 configuration for power extraction. A turbine shroud 402 surrounds the rotor 410 and is supported by or connected to the blades or spokes of the stator 408a. The turbine shroud 402 has the cross-sectional shape of an airfoil with the suction side (i.e. low pressure side) on the interior of the shroud. An ejector shroud 428 is coaxial with the turbine shroud 402 and is supported by connector members 405 extending between the two shrouds. An annular area is thus formed between the two shrouds. The rear or downstream end of the turbine shroud 402 is shaped to form two different sets of mixing lobes 418, 420. High energy mixing lobes 418 extend inwardly towards the central axis of the mixer shroud 402; and low energy mixing lobes 420 extend outwardly away from the central axis.

Free stream air indicated generally by arrow 406 passing through the stator 408a has its energy extracted by the rotor 410. High energy air indicated by arrow 429 bypasses the shroud 402 and stator 408a and flows over the turbine shroud 402 and directed inwardly by the high energy mixing lobes 418. The low energy mixing lobes 420 cause the low energy air exiting downstream from the rotor 410 to be mixed with the high energy air 429.

Figure 9:
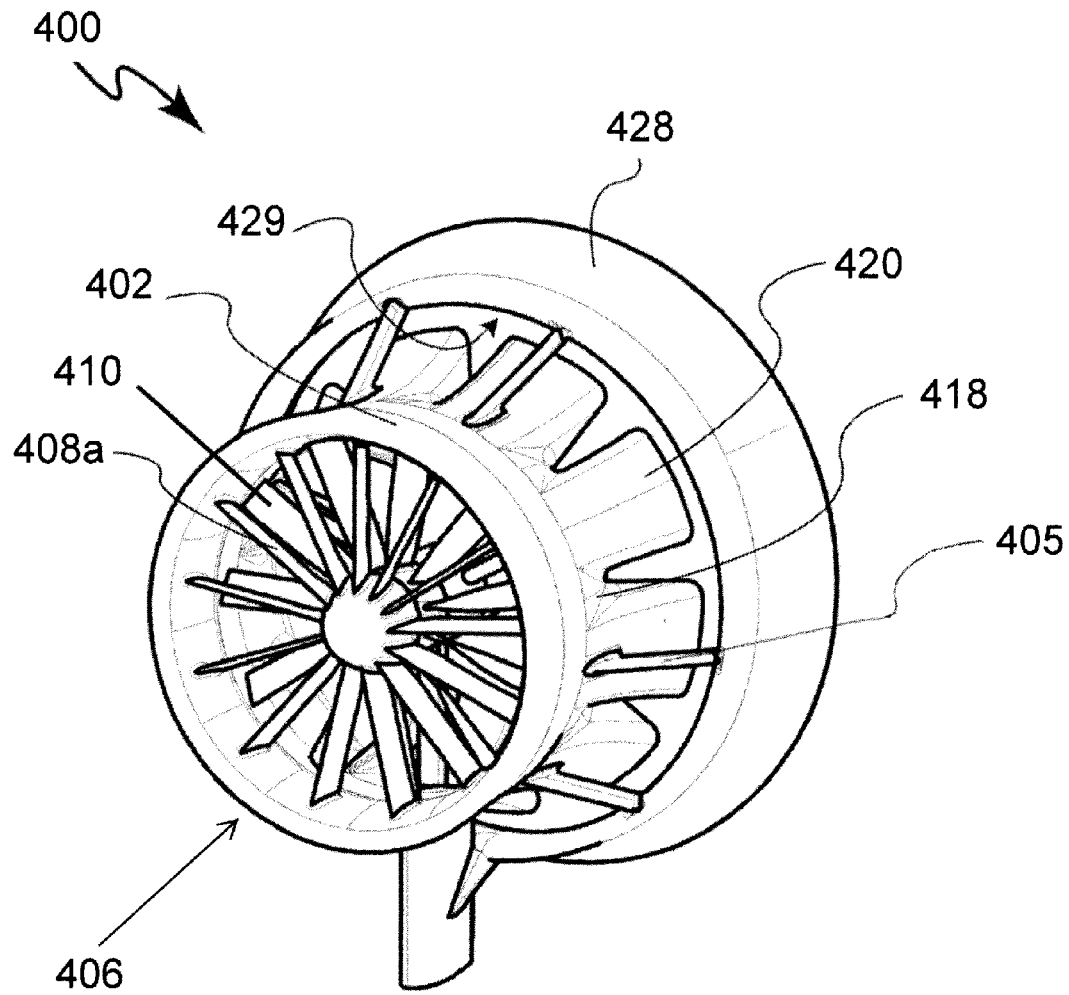
FIG. 9 is a front perspective view of another exemplary embodiment of a MEWT according to the present disclosure.
Figure 10:
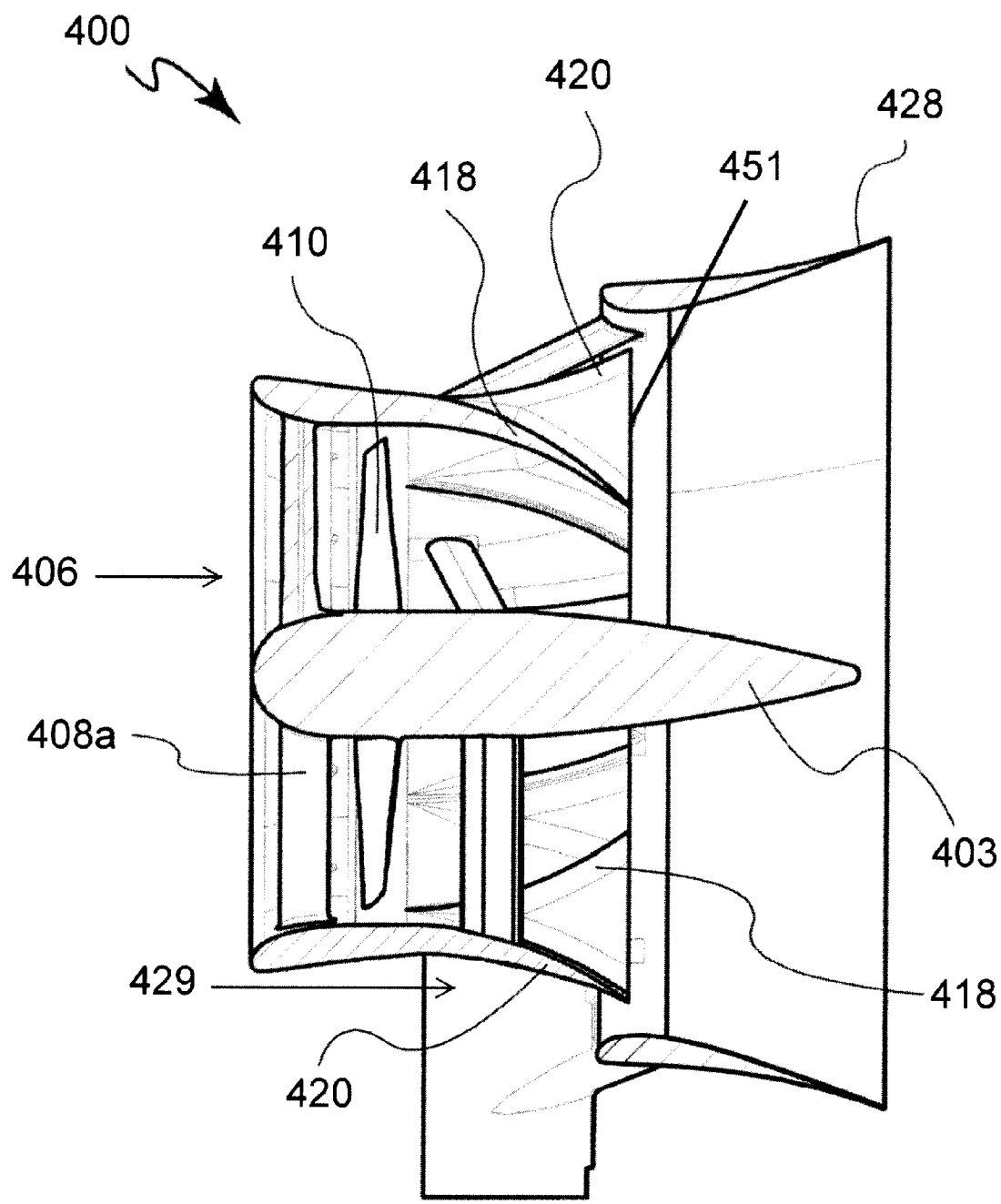
FIG. 10 is a side cross-sectional view of the MEWT of FIG. 9 taken through the turbine axis.
Figure 11:
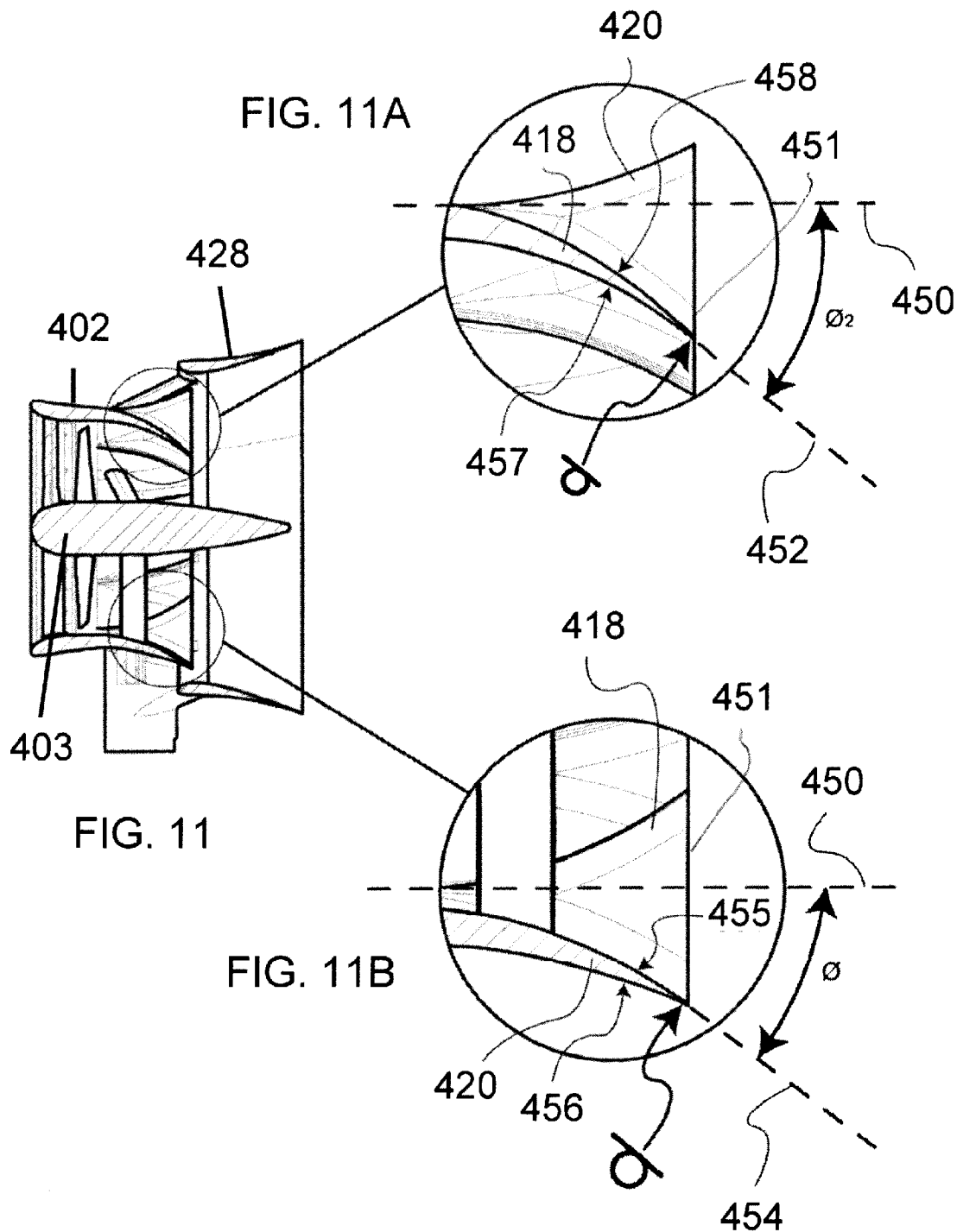
FIG. 11 is a smaller view of FIG. 10.

Referring to FIG. 10, the center nacelle 403 and the trailing edges of the low energy mixing lobes 420 and the trailing edge of the high energy mixing lobes 418 are shown in the axial cross-sectional view of the turbine of FIG. 9. The ejector shroud 428 is used to direct inwardly or draw in the high energy air 429. Optionally, nacelle 403 may be formed with a central axial passage therethrough to reduce the mass of the nacelle and to provide additional high energy turbine bypass flow.

In FIG. 11A, a tangent line 452 is drawn along the interior trailing edge indicated generally at 457 of the high energy mixing lobe 418. A rear plane 451 of the turbine shroud 402 is present. A line 450 is formed normal to the rear plane 451 and tangent to the point where a low energy mixing lobe 420 and a high energy mixing lobe 418 meet. An angle $\varnothing_2$ is formed by the intersection of tangent line 452 and line 450. This angle $\varnothing_2$ is between 5 and 65 degrees. Put another way, a high energy mixing lobe 418 forms an angle Ø$_2$ between 5 and 65 degrees relative to the turbine shroud 402.

In FIG. 11B, a tangent line 454 is drawn along the interior trailing edge indicated generally at 455 of the low energy mixing lobe 420. An angle Ø is formed by the intersection of tangent line 454 and line 450. This angle Ø is between 5 and 65 degrees. Put another way, a low energy mixing lobe 420 forms an angle Ø between 5 and 65 degrees relative to the turbine shroud 402.

Figure 12:
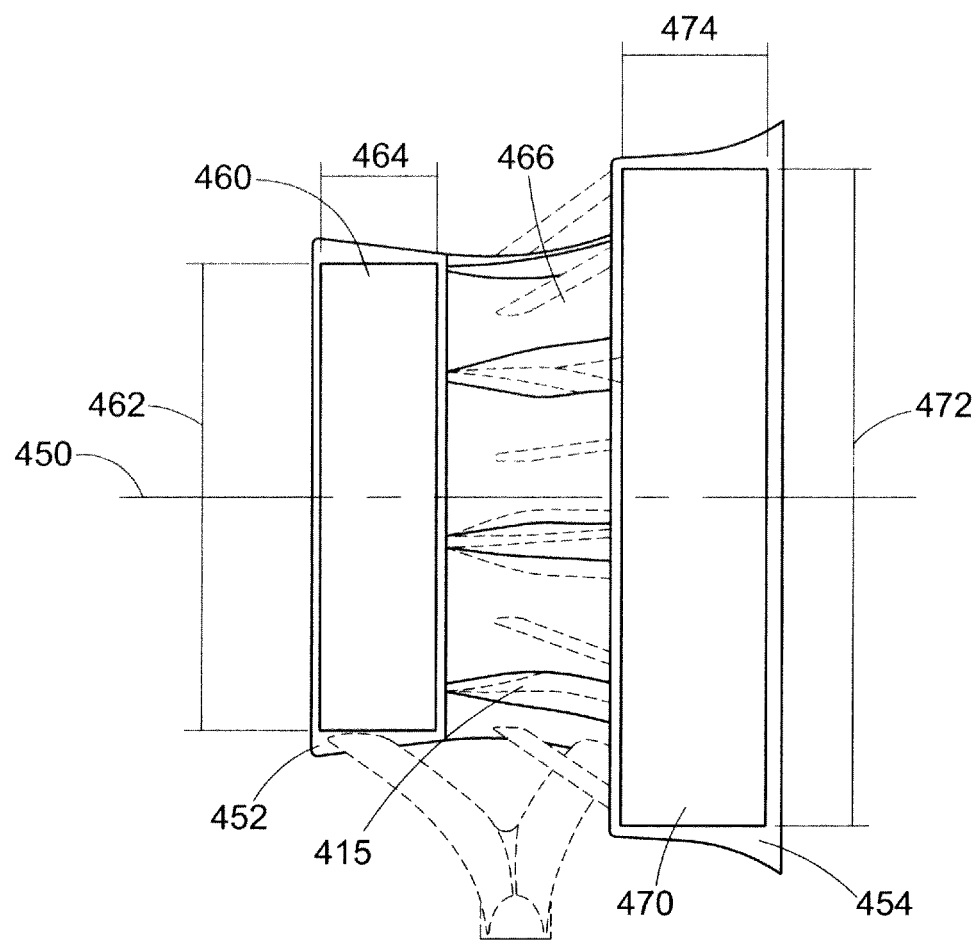
FIG. 12 is a side view of the MEWT of FIG. 9.

FIG. 12 is a side view of the MEWT 400, and shows the exterior surfaces 452, 454 of both the turbine shroud 402 and the ejector shroud 428. In particular, it should be noted that the exterior surface of each shroud will have an outer surface, labeled with reference numerals 460 and 470, that is relatively smooth, and can be rather large. The "exterior surface" refers to the entirety of the shroud surface, while the "outer surface" refers to the portion of the exterior surface that is smooth. For example, it is believed that a shroud having a diameter of 50 feet (measured from the central axis) would provide an outer surface 460, 470 having dimensions of about 100 feet in height 462, 472 and about 25 feet in length 464, 474. In comparison, as noted above, the nacelle of the typical HAWT is about 20 feet in height and about 79 feet in length, and that height is broken up by a line indicating the joinder of the top and bottom pieces of the nacelle. The length 464, 474 here is measured parallel to the central axis 450 of the turbine, and the height 462, 472 is measured perpendicular to the central axis and parallel to the yaw axis.

It is contemplated that the outer surface of the MEWT can be used to mount other devices, also referred to herein as panels. In particular embodiments, the outer surface is used to mount an advertising display. It is contemplated that the advertising display could be a static display, such as for example a simple logo or poster. Alternatively, the advertising display could be an active display, such as a digital billboard. A digital billboard is generally comprised of a large liquid crystal display or a plurality of light sources, such as light-emitting diodes, that can be used to display an image. The image being displayed by the digital billboard can be changed without the need to ascend to the level of the billboard, and several images can be easily rotated on a digital billboard. It is also contemplated that the digital billboard could be powered from the energy generated by the MEWT. One advantage of using a MEWT here is that because the blades are enclosed by the shroud in a MEWT, there is no distracting blade or pulsing blade shadow that makes it more difficult to see the advertising display.

In this respect, one advantage of the outer surface of the MEWT is that the outer surface is smooth and continuous, and can have a relatively large height. This allows an unbroken image to be placed on the outer surface. In comparison, the nacelle of the typical HAWT provides only an unbroken height of perhaps 10 feet, which is unsuitable for advertisements. For comparison, the standard sizes for conventional roadside billboards have a height of 14 to 20 feet.

In other embodiments, the outer surface is used to mount solar panels. The solar panel, or photovoltaic panel, is generally an assembly of photovoltaic cells, or a thin layer solar film, that generates electricity using the photoelectric effect. One advantage of connecting solar panels to the outer surface of the shrouds is that the turbine provides a cooling source and good ventilation for the solar panel, which minimizes overheating of the solar panel. The large surface area of the shrouds of the wind turbines of the present disclosure also allow for exposure to sunlight that is simply not available on the nacelle of a HAWT.

Referring back to FIG. 12, in embodiments, the ratio of the height to the length of the outer surface, i.e. the portion of the exterior surface of the shroud that is smooth and can be used for mounting the advertising display or solar panels (e.g. the ratio of reference numerals 462:464 or 472:474) can be from about 2 to about 5.

Figure 13:
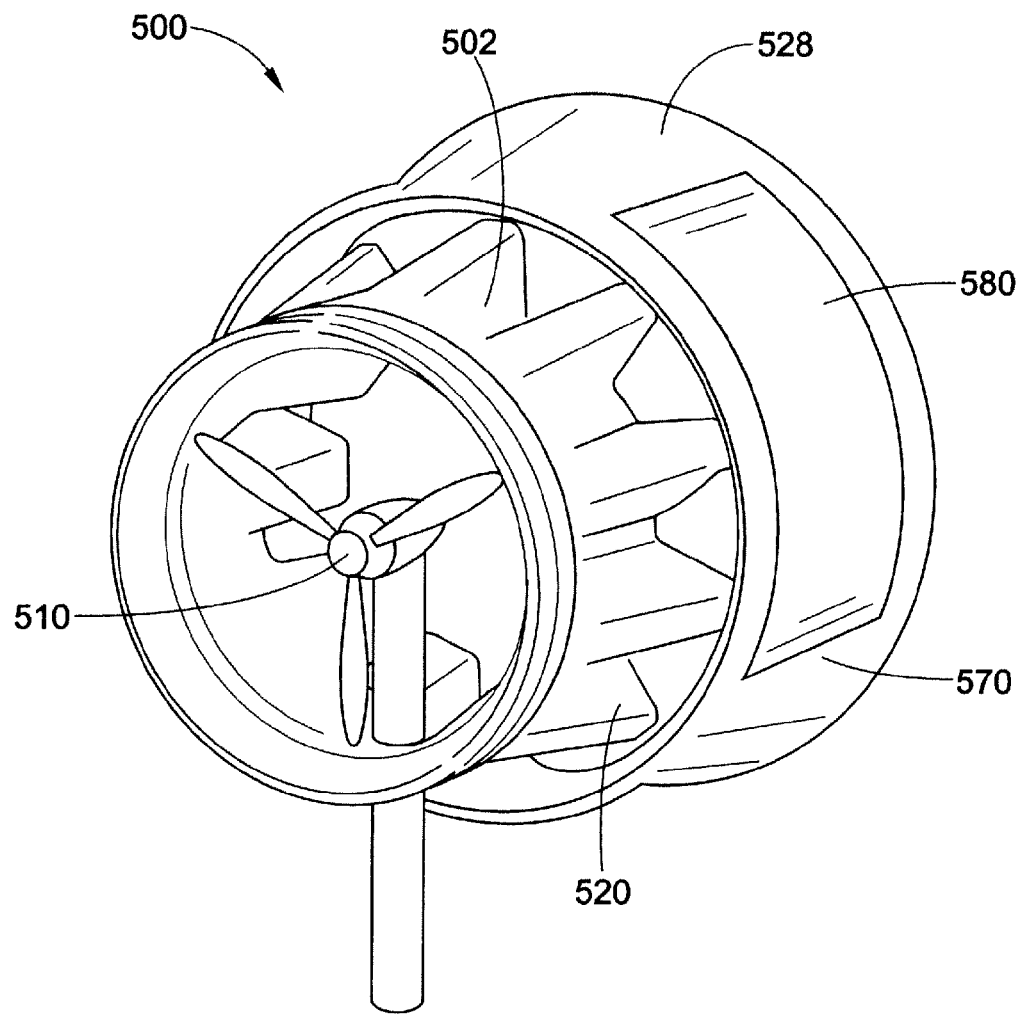
FIG. 13 is a perspective view of an exemplary embodiment of a MEWT having an outer surface suitable for advertising or for mounting solar panels.

FIG. 13 is one exemplary embodiment of such a wind turbine. Here, the wind turbine 500 includes a propeller assembly 510, a turbine shroud 502, and an ejector shroud 528. The turbine shroud 502 includes mixing lobes 520 on a trailing edge thereof. An advertising display 580 is located on an outer surface 570 of the ejector shroud 528. In this embodiment, the advertising display is placed directly on the outer surface 570.

Generally, the outer surface on which the advertising display is placed should be relatively smooth. "Smooth" refers to whether the surface is free from irregularities or projections, i.e. whether the surface is even. In numeric terms, a surface having irregularities of up to 1 centimeter can still be considered "smooth". The outer surface does not need to be flat, i.e. the surface does not need to be located within a plane. As can be seen in FIGS. 12 and 13, the outer surface can be curved in two of the three dimensions (yaw and pitch). It should be noted that from long distances and depending on the curvature, the outer surface may appear to be flat, and that techniques are well known in the art for placing images on three-dimensional surfaces that appear two-dimensional. For example, the trailing edge 466 of the shroud of FIG. 13 would not be considered a suitable surface for advertising due to the presence of the mixing lobes 415, which result in a surface that is not smooth. In embodiments, the exterior surface of the shroud includes a smooth surface and a non-smooth surface.

Figure 14:
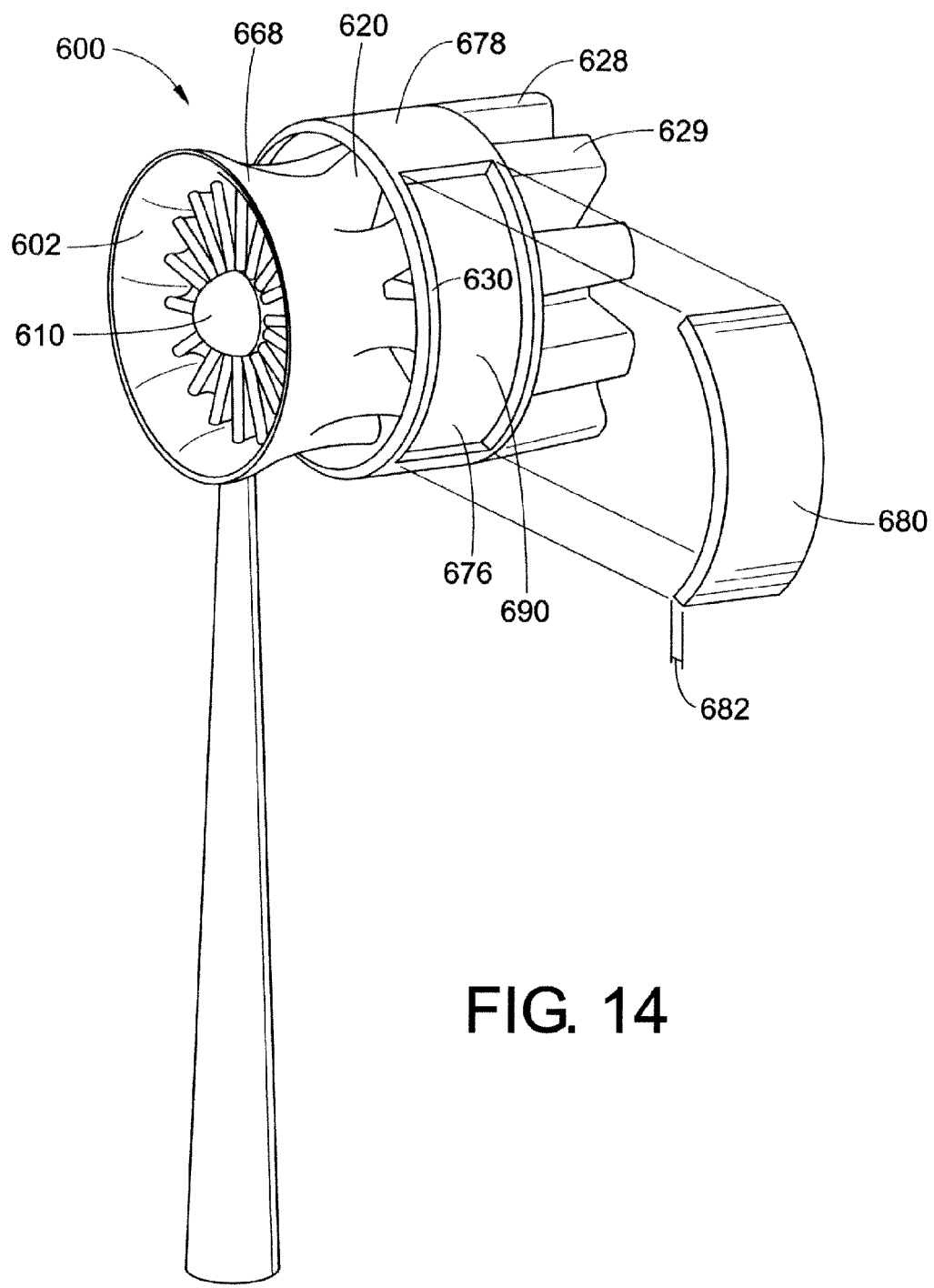
FIG. 14 is a perspective view of another exemplary embodiment of a MEWT, showing a separate panel being mounted into a recess on the outer surface of a shroud on the MEWT.
Figure 15:
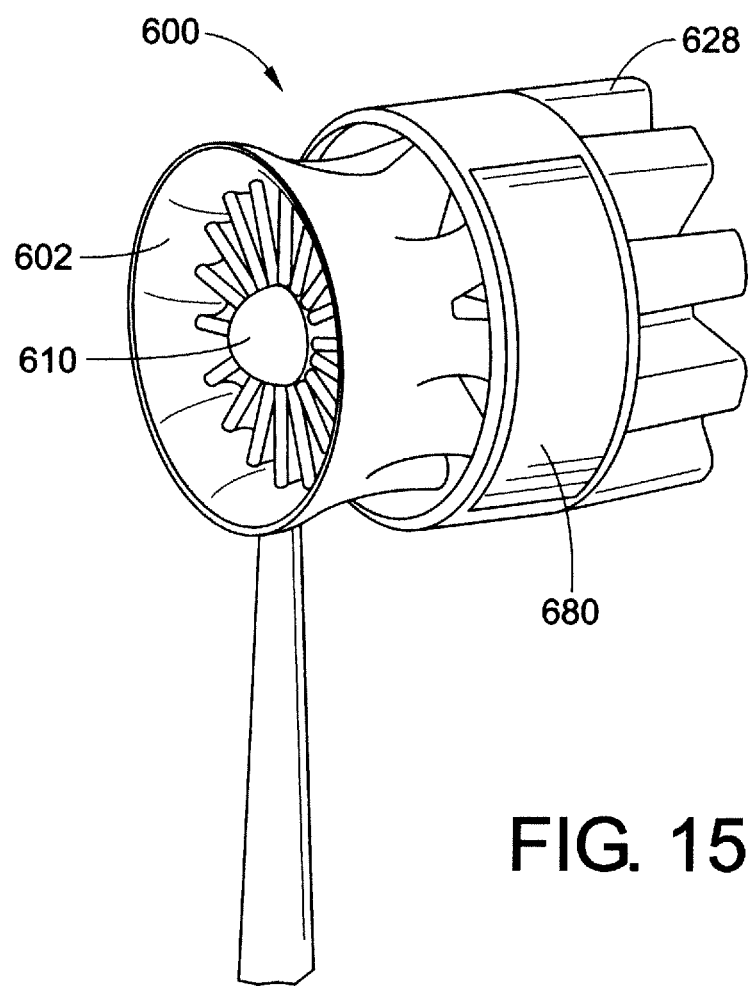
FIG. 15 is a perspective view of the MEWT of FIG. 14, showing the MEWT with the separate panel located in the recess to form a smooth outer surface.

FIGS. 14 and 15 show another exemplary embodiment of a wind turbine. Here, the wind turbine 600 includes a rotor/stator assembly 610, a turbine shroud 602, and an ejector shroud 628. The turbine shroud 602 includes mixing lobes 620 on a trailing edge thereof. The ejector shroud 628 also includes mixing lobes 629 on a trailing edge thereof.

In these Figures, a separate panel 680 is placed on an outer side surface 676 of the ejector shroud 628. It is also contemplated that panels could be placed on an outer top surface 668, 678 of the shroud.

It should be noted that panels, such as solar panels, typically have a thickness 682. It is contemplated that in embodiments, the shroud on which the panel 680 is mounted (the turbine shroud 602 and/or the ejector shroud 628 is shaped to contain one or more recesses 690 into which the panel can be inserted. In this manner, the panel does not disrupt the wind flow over the shroud. For example, an advertisement could be placed on the separate panel, and the panel 680 would then be placed into the recess 690. With regards to timing, this would allow the advertisement to be made prior to the assembly of the turbine, so that the advertisement could be placed on the turbine at the time of assembly, and the need to provide cranes or equipment solely for the purpose of placing advertisement on the turbine is reduced. As shown here, the ejector shroud 628 includes a leading edge 630, and the recess 690 is located beyond the leading edge. Put another way, the panel 680 does not form the leading edge 630 of the ejector shroud 628. In addition, the placement of the panel 680 in the recess 690 forms a smooth outer surface on the ejector shroud 628. In embodiments, the recess 690 has a depth of from about 1 mm to about 50 centimeters. Of course, multiple panels may be placed into a given recess, and/or the shroud may have multiple recesses into which panels can be placed.

FIG. 15 shows the turbine prior to the panel 680 being placed into recess 690, and FIG. 16 shows the turbine after the panel 680 has been placed into the recess 690. Again, in FIG. 16, the panel 680 forms a smooth outer surface on the ejector shroud 628.

It should be understood by those skilled in the art that modifications can be made without departing from the spirit or scope of the disclosure. Accordingly, reference should be made primarily to the appended claims rather than the foregoing description.

The invention claimed is:

1. A shrouded horizontal axis wind turbine, comprising:
an impeller; and
a turbine shroud surrounding the impeller, the turbine shroud having an inlet, an outlet and an exterior surface extending between the inlet and the outlet and comprising a plurality of mixing lobes located along a trailing edge of the outlet, at least a portion of the exterior surface extending from the inlet to the outlet being exposed to surrounding environmental conditions, the exterior surface having a recess shaped to receive a flush-mounting advertising display panel.

2. The wind turbine of claim 1, wherein the recess is shaped to receive a flush-mounting advertising display panel including a digital billboard.

3. The wind turbine of claim 1, wherein the recess is located on a side of the turbine shroud.

4. The wind turbine of claim 1, wherein the recess is located on a top of the turbine shroud.

5. The wind turbine of claim 1, wherein the ratio of a height of the recess to a length of the recess is from about 2 to about 5.

6. The wind turbine of claim 1, wherein the exterior surface has a non-smooth surface.

7. The wind turbine of claim 1, further comprising an ejector shroud having an inlet and an exit, the trailing edge of the turbine shroud extending into the ejector shroud inlet.

8. The wind turbine of claim 7, wherein the ejector shroud has an exterior surface having a recess shaped to receive a second flush-mounting advertising display panel.

9. The wind turbine of claim 1, wherein the surrounding environmental conditions are weather related.

10. A shrouded horizontal axis wind turbine, comprising:
an impeller;
a turbine shroud surrounding the impeller, the turbine shroud comprising a plurality of mixing lobes located along a trailing edge; and
an ejector shroud having an inlet and an outlet and an exterior surface extending between the inlet and the outlet, the trailing edge of the turbine shroud extending into the ejector shroud inlet, the ejector shroud including at least a portion of the exterior surface that extending from the inlet to the outlet being exposed to surrounding environmental conditions, the exterior surface having a recess shaped to receive a flush-mounting advertising display panel.

11. The wind turbine of claim 10, wherein a the recess is shaped to receive a flush-mounting advertising display panel including a digital billboard.

12. The wind turbine of claim 10, wherein the recess is located on a side or a top of the ejector shroud.

13. The wind turbine of claim 10, wherein the ratio of a height of the recess to a length of the recess is from about 2 to about 5.

14. The wind turbine of claim 10, wherein the exterior surface has a non-smooth surface.

15. A shrouded horizontal axis wind turbine, comprising:
an impeller;
a shroud surrounding the impeller, the shroud having an inlet, an outlet and an exterior surface extending between the inlet and the outlet, including at least a portion of the exterior surface extending from the inlet to the outlet being exposed to surrounding environmental conditions, the exterior surface having a recess shaped to receive a flush-mounting solar panel.

16. The wind turbine of claim 15, wherein the recess is located on a side or a top of the shroud.

17. The wind turbine of claim 15, wherein the ratio of a height of the recess to a length of the recess is from about 2 to about 5.

18. The wind turbine of claim 15, wherein the exterior surface has a non-smooth surface.

* * * * *